United States Patent Office 2,822,645
Patented Feb. 11, 1958

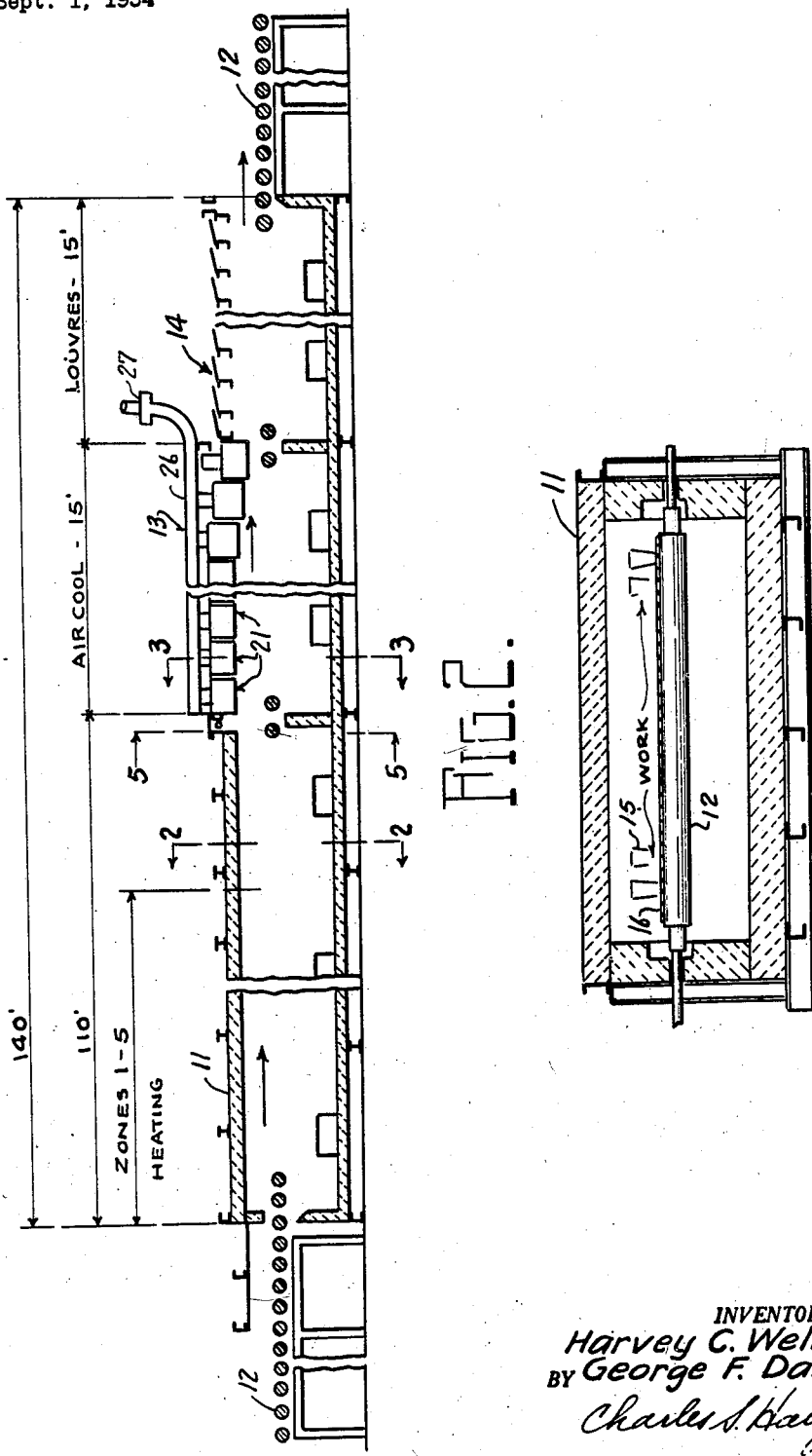

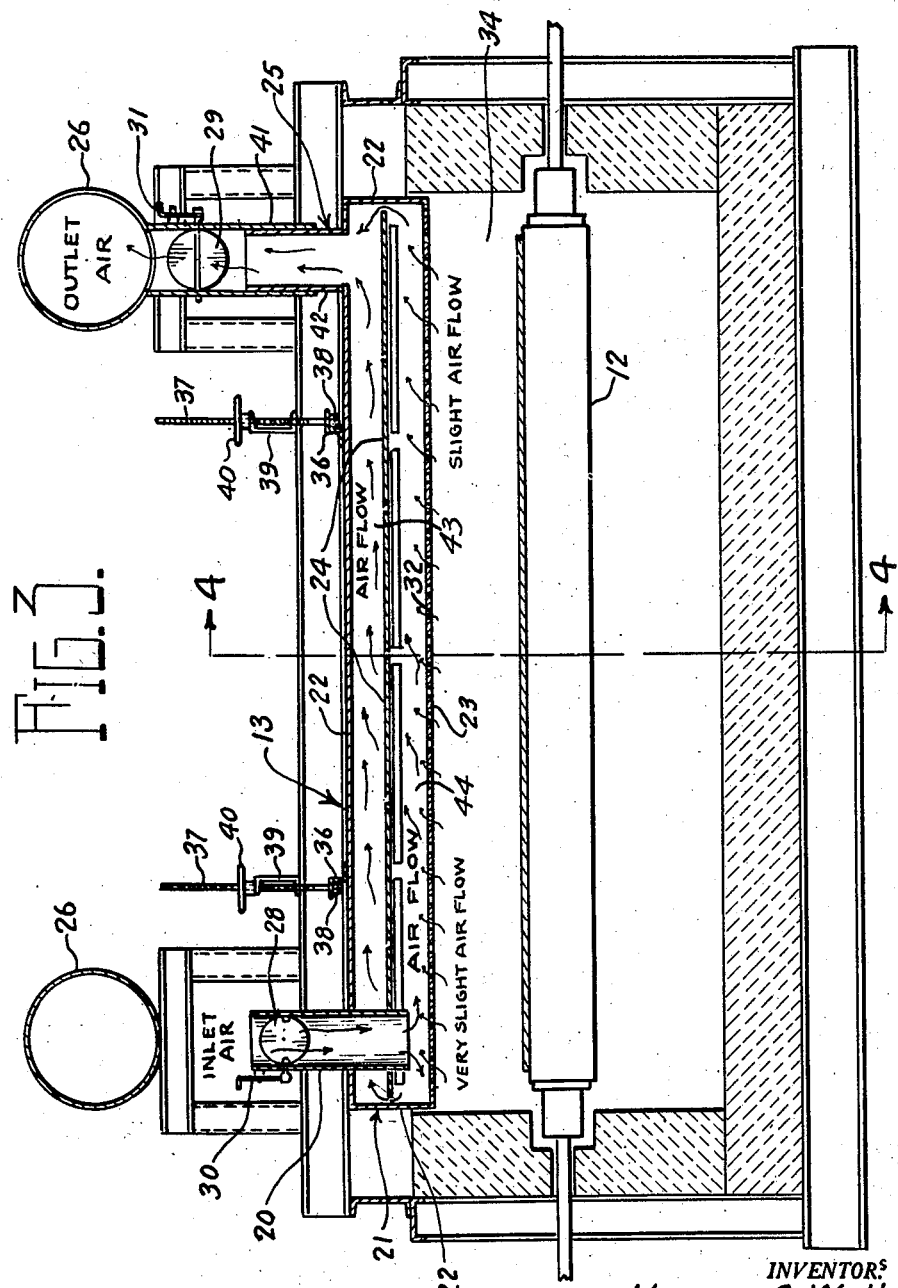

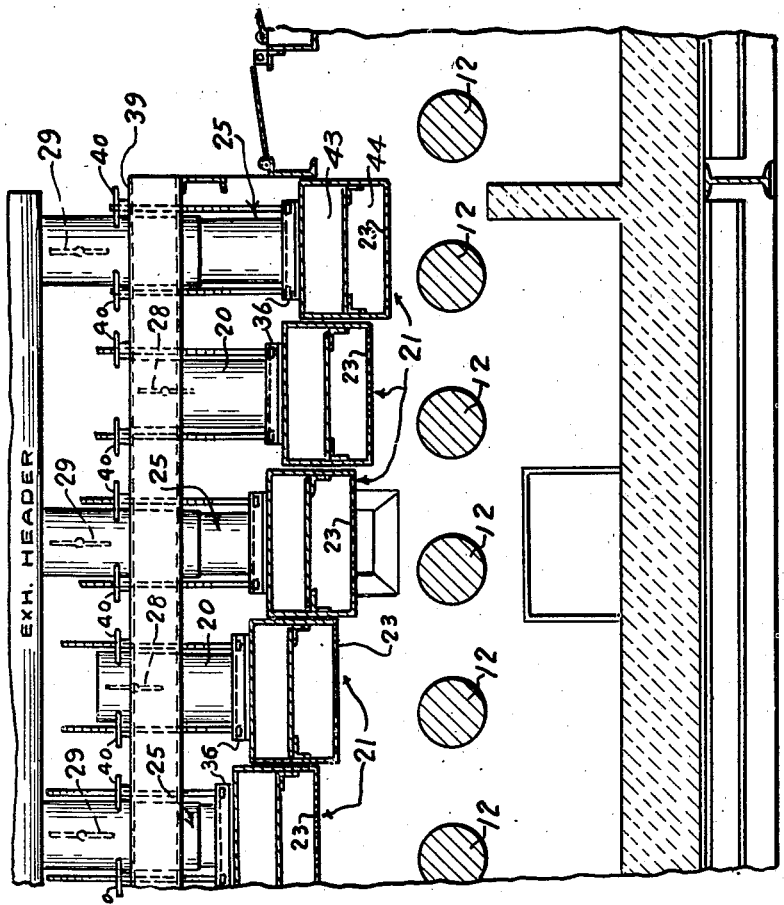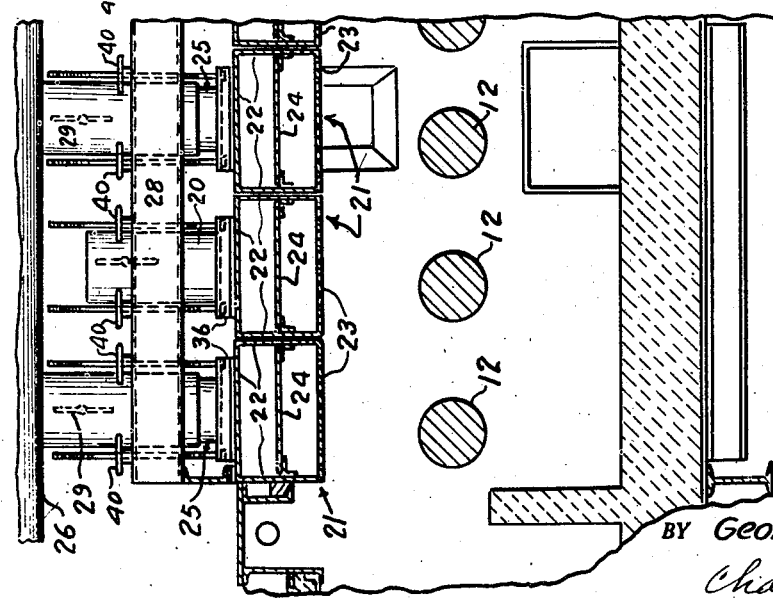

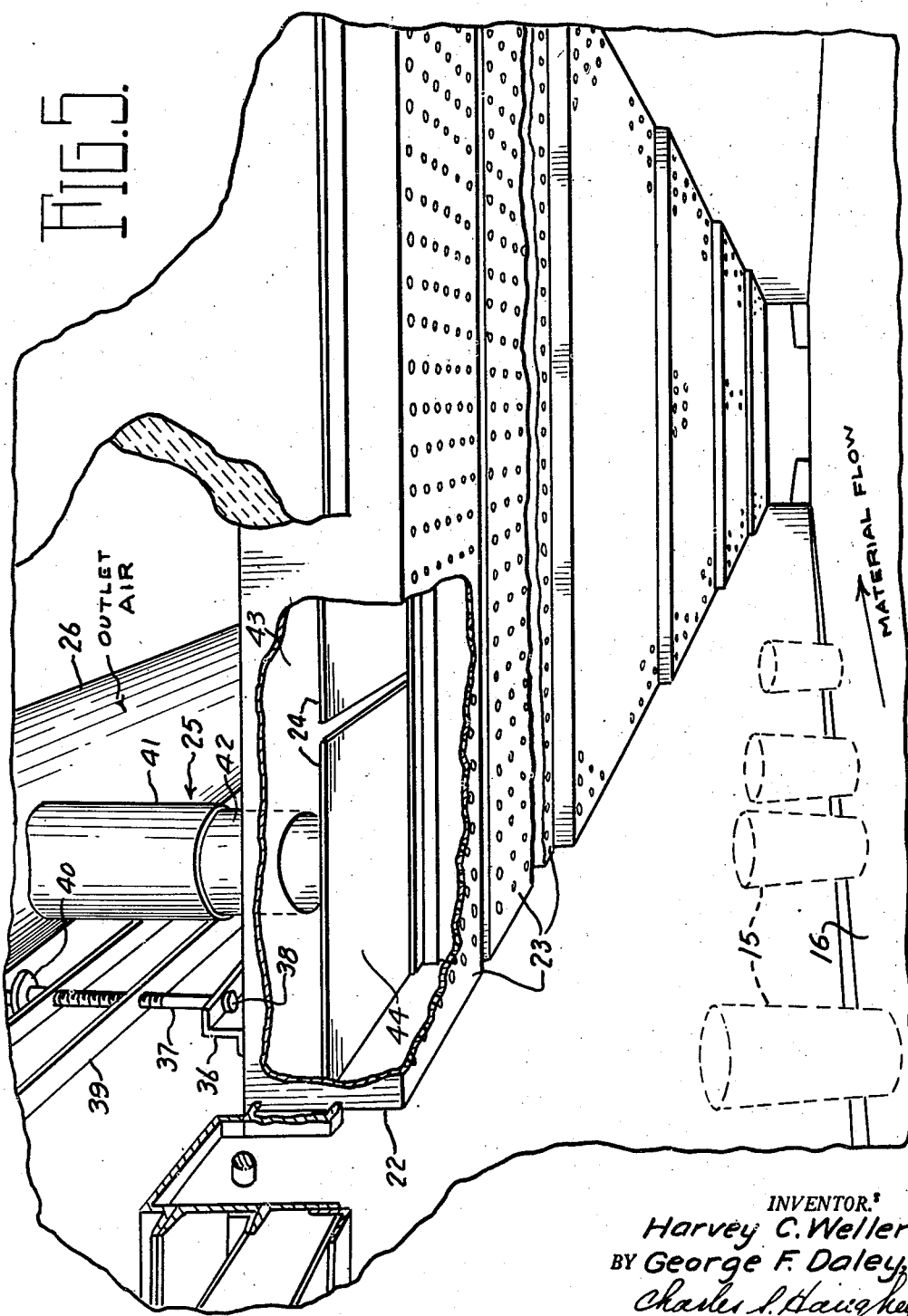

2,822,645

GLASS ANNEALING LEHR

Harvey C. Weller and George F. Daley, Jr., Toledo, Ohio, assignors to Surface Combustion Corporation, Toledo, Ohio, a corporation of Ohio Application September 1, 1954, Serial No. 453,535

8 Claims. (Cl. 49—47)

This invention relates to a glass annealing lehr, and, more particularly, to such lehr having a particular cooling arrangement which provides both radiant and convective cooling.

In the annealing of glassware it is necessary only to heat the ware to a temperature sufficiently high to relieve stresses therein, and then to cool the ware to about room temperature. However, during the course of the heating, and also during the course of the cooling, it is necessary to avoid excessive temperature gradients in order to prevent glass breakage. The instant invention is concerned with apparatus for controlling the cooling rate for the ware in such a lehr. After the ware has reached its predetermined annealing temperature, and has cooled below its strain point, rapid cooling does not introduce permanent strains, so that the only consideration concerning the ware which determines maximum permissible cooling rate is the possibility of actual breakage. However, since glass annealing lehrs are usually large furnaces, often longer than 100 feet, and as wide as ten feet or even more, changes in temperature or wind conditions in a plant where they are operated will substantially affect the cooling rate. As a consequence, it has been necessary to operate previously known lehrs at a cooling rate substantially slower than the maximum permissible for the ware to avoid the possibility that changing conditions in the surroundings of the lehr would so increase the rate as to cause breakage.

The instant invention has for an object the provision in a glass cooling lehr of apparatus for regulating the cooling rate therein for the particular ware being annealed, and regardless of air conditions surrounding the lehr.

Another object of the invention is to provide an annealing lehr having apparatus for controlling the cooling rate to approximately the maximum possible without glass breakage regardless of the air conditions surrounding the lehr.

Other objects and advantages will be apparent from the description which follows, reference being had to the accompanying drawings, in which:

Fig. 1 is a partially schematic view in vertical section showing one particular glass annealing lehr according to the invention;

Fig. 2 is a vertical sectional view along the line 2—2 of Fig. 1;

Fig. 3 is an enlarged view in vertical section along the line 3—3 of Fig. 1 showing details of the apparatus according to the invention for controlling the cooling rate in lehrs;

Fig. 4 is an enlarged vertical sectional view along the line 4—4 of Fig. 3 showing details of one particular adjustment feature of lehr-cooling apparatus according to the invention; and Fig. 5 is a view in perspective, with parts broken away, showing the lehr-cooling apparatus of Figs. 1 through 4.

Referring now in more detail to the drawings, and in particular to Fig. 1, the glass annealing lehr shown in the drawings comprises a refractory lined shell 11, roller conveyors 12, cooling apparatus according to the invention indicated generally at 13, a louvered final cooling zone indicated generally at 14, and suitable heating means, for example gas burners, not illustrated.

As will be apparent from Fig. 2, work 15 is carried on platens 16 which are moved by the rollers 12 in the direction of the arrows in Fig. 1 through the furnace. The rollers 12 are suitably journaled and driven in any conventional manner, not illustrated.

Referring now to Fig. 3, the lehr cooling apparatus 13, in the specific embodiment of the invention shown, comprises a cooling air inlet duct 20 through which ambient air is supplied to the interior of a cooling box 21 having five solid walls 22 and a perforate plate bottom 23 which also forms the top surface of the cooling zone of the lehr. Air is introduced into the cooling box 21 through the duct 20 below the level of a series of horizontally disposed baffles 24 which, in the specific embodiment of the invention shown, divide the cooling box into an upper portion 43 and a lower portion 44 of approximately equal volumes.

Air is drawn from the duct 20, through portions 43 and 44 and a duct indicated generally at 25, and into a connecting duct 26 which is preferably under a slight vacuum drawn by a fan 27 (Fig. 1) driven in any suitable manner, not illustrated. Referring again to Fig. 3, dampers 28 and 29, which can be manually adjusted by controls 30 and 31, are provided, respectively, in the ducts 20 and 25. It will be noted that, when a vacuum is applied to the connecting duct 26, air is drawn thereinto from the upper portion 43 of the box 21, above the baffles 24. This tends to draw air from the lower portion 44 of the box 21 through open spaces 32 between the baffles 24. When the damper 28 is in the position shown in Fig. 3, ambient air passes readily through the duct 20 into the portion of the box 21 below the baffles 24, with the result that air drawn through the duct 25 is replaced almost entirely by ambient air, with only limited flow of air from the cooling zone of the lehr proper, which is indicated by the numeral 34, into the cooling box. Ambient air drawn through the duct 20 into the lower portion 44 of the cooling box performs the principal function of cooling the perforate plate bottom 23 to a temperature at which such bottom is effective for radiant cooling of ware in the cooling zone 34.

Referring now to Fig. 4, the particular annealing lehr according to the invention shown comprises a plurality of cooling apparatuses 13. In the specific embodiment of the invention shown alternate cooling boxes 21 are reversed so that the outlet air duct 25 of any box is adjacent the inlet air duct 20 of the cooling box of each adjacent box.

As will be apparent from Figs. 3 and 4, each of the cooling boxes 21 has attached to its upper surface a generally Z-shaped hanging clip 36 having suitable holes through which threaded rods 37 are inserted. The rods 37 are engaged against the clips 36 by nuts 38, and against support channels 39 by hand wheels 40. Each of the cooling boxes 21 is supported only by the threaded rods 37, and has slight clearances between other parts of the lehr so that it is free for limited vertical movement to adjust its height above the rollers 12. Such movement is effected by suitable adjustment of the hand wheels 40. The outlet air duct indicated generally at 26 is composed of an outer member 41 and an inner member 42 which telescopes inside the member 41 to permit such limited vertical adjustment. The inlet air duct 20 merely extends above the top of each cooling box 21 and is raised or lowered therewith.

In operation, in a glass annealing lehr, for example, cooling apparatus according to the invention has been found to be highly effective for cooling ware at any desired rate. It has been found that it is usually preferred to effect initial cooling (in the portion of the cooling zone of the lehr adjacent the heating zones thereof) essentially by radiation. For this purpose, the dampers 28 in the inlet ducts 20 are positioned in a substantially fully opened position as represented in Fig. 3, so that there is no obstruction to the admission of ambient air into the boxes 21, and virtually all of the air withdrawn from the boxes through the ducts 25 is supplied from outside the furnace through the ducts 20, as described. The main mechanism for removing heat from the ware in this portion of the apparatus 13 is by radiation absorbed by the perforate plate bottom 23 of the boxes 21, and transferred by such plates to the cooling air drawn through the box. In addition, there is usually a limited amount of air flow from the interior of the lehr through the perforations in the plates 23.

In cooler portions of the apparatus 13, however, nearer the discharge end of the lehr, radiation cooling is comparatively ineffective, and convection cooling is used. To effect convection cooling in the apparatus 13, or in a portion thereof, it is necessary only to close or partially close the dampers 28 in the inlet ducts 20 to block the entry of ambient air into the boxes 21. Air exhausted through the ducts 25 is then supplied mainly from the interior of the lehr, being drawn through the perforate plates 23. Convection cooling can be further facilitated by lowering the boxes 21 into close proximity to the upper surface of ware in the lehr.

In the specific embodiment of the invention shown, as will be apparent from Fig. 4, the first several cooling boxes 21, adjacent the heating zones of the lehr, and the inlet dampers 28, thereof, are positioned for radiant cooling, while the last several boxes 21, adjacent the discharge end of the lehr, are positioned for convective cooling. This arrangement is particularly advantageous for several reasons. Convective cooling is more effective at lower ware temperatures achieved at the discharge end of the apparatus 13, so that this arrangement provides highly effective cooling. In addition, the convective cooling withdraws from the lehr a substantial amount of atmosphere, so that cooling boxes 21 positioned principally for convective cooling are particularly effective at preventing "drift" therebeyond, or movement of ambient air into the hotter portions of the lehr where the effect upon lehr temperatures, and cooling rate of the ware would be disadvantageous. Drift may be caused, for example, by even a slight breeze against the discharge end of a lehr. It has been found in actual practice that a glass annealing lehr incorporating cooling apparatus according to the invention can anneal approximately 40 percent more glass per unit of time than an identical lehr provided with conventional cooling apparatus, and that the improved lehr according to the invention is capable of sustained operation under changing conditions without glass breakage. The increased productivity of apparatus according to the invention was solely attributable to the more rapid cooling rate that could be used.

It has also been found that substantial improvement over prior art lehr cooling apparatus is achieved even though no air is exhausted through the connecting duct 26. In this instance, both the air inlet ducts 20 and the air exhaust ducts 25 act merely as stacks, through which air or atmosphere is discharged from a cooling zone of the lehr. The principal cooling effect achieved in this manner is convective, with the result that the apparatus is less flexible than in the preferred embodiment shown, but entirely satisfactory for many operations, and effective for minimizing or eliminating drift.

It will be apparent that various changes and modifications can be made from the specific details discussed herein and shown in the accompanying drawings without departing from the spirit of the attached claims, and that the invention comprises, in its essential details, apparatus for controlling the cooling rate of ware in a glass annealing lehr, which apparatus comprises a cooling box having one perforate surface directed toward ware in the lehr for receiving radiant heat therefrom, duct means for withdrawing gas from the cooling box, and damper means in the duct means for varying the obstruction to the flow of gas through the latter.

We claim:

1. A glass annealing lehr having means for moving ware into, through and from the lehr, means for progressively heating the ware to an annealing temperature, and means for progressively cooling the ware from the annealing temperature to a temperature at which ware can be subjected to ambient air without breakage, characterized by apparatus for controlling the cooling rate of the ware comprising a plurality of contiguous cooling boxes, each said cooling box having one perforate surface directed toward ware in the lehr for receiving radiant heat therefrom, a baffle dividing said cooling box into a portion adjacent ware and a portion remote from ware, exhaust duct means providing a gas passage between the portion of said cooling box remote from ware and the exterior of the lehr, cooling air inlet duct means providing a gas passage between the portion of said cooling box adjacent ware and the exterior of the lehr, means for moving said cooling box toward and away from ware to vary the minimum distance between ware and said perforate surface, means for applying vacuum to said exhaust duct means, and damper means in each of said duct means for varying the obstruction to the flow of gas therethrough.

2. A glass annealing lehr having means for moving ware into, through and from the lehr, means for progressively heating the ware to an annealing temperature, and means for progressively cooling the ware from the annealing temperature to a temperature at which ware can be subjected to ambient air without breakage, characterized by apparatus for controlling the cooling rate of the ware comprising a cooling box having one perforate surface directed toward ware in the lehr for receiving radiant heat therefrom, a baffle dividing said cooling box into a portion adjacent ware and a portion remote from ware, exhaust duct means providing a gas passage between the portion of said cooling box remote from ware and the exterior of the lehr, cooling air inlet duct means providing a gas passage between the portion of said cooling box adjacent ware and the exterior of the lehr, means for moving said cooling box toward and away from ware to vary the minimum distance between ware and said perforate surface, means for applying vacuum to said exhaust duct means, and damper means in each of said duct means for varying the obstruction to the flow of gas therethrough.

3. A glass annealing lehr having means for moving ware into, through and from the lehr, means for progressively heating the ware to an annealing temperature, and means for progressively cooling the ware from the annealing temperature to a temperature at which ware can be subjected to ambient air without breakage, characterized by apparatus for controlling the cooling rate of the ware comprising a cooling box having one perforate surface directed toward ware in the lehr for receiving radiant heat therefrom, a baffle dividing said cooling box into a portion adjacent ware and a portion remote from ware, exhaust duct means providing a gas passage between the portion of said cooling box remote from ware and the exterior of the lehr, cooling air inlet duct means providing a gas passage between the portion of said cooling box adjacent ware and the exterior of the lehr, means for applying vacuum to said exhaust duct means, and damper means in each of said duct means for varying the obstruction to the flow of gas therethrough.

4. A glass annealing lehr having means for moving ware into, through and from the lehr, means for progressively heating the ware to an annealing temperature, and means for progressively cooling the ware from the annealing temperature to a temperature at which ware can be subjected to ambient air without breakage, characterized by apparatus for controlling the cooling rate of the ware comprising a cooling box having one perforate surface directed toward ware in the lehr for receiving radiant heat therefrom, a baffle dividing said cooling box into a portion adjacent ware and a portion remote from ware, duct means providing a gas passage between the portion of said cooling box remote from ware and the exterior of the lehr, duct means providing a gas passage between the portion of said cooling box adjacent ware and the exterior of the lehr, and damper means in each of said duct means for varying the obstruction to the flow of gas therethrough.

5. A glass lehr having means for moving ware into, through, and from the lehr, and means for progressively cooling the ware to a temperature at which ware can be subjected to ambient air without breakage, characterized by apparatus for controlling the cooling rate of the ware comprising a cooling box having one perforate surface directed toward ware in the lehr for receiving radiant heat therefrom, a baffle dividing said cooling box into a portion adjacent ware and a portion remote from ware, duct means providing an exit for gas from said cooling box to the exterior of said lehr, duct means providing an entrance for gas from the exterior of said lehr to said cooling box, damper means in each of said duct means for varying the obstruction to the flow of gas therethrough, and means for moving said cooling box toward and away from said ware to vary the minimum distance between ware and said perforate surface.

6. A glass lehr having means for moving ware into, through, and from the lehr, and means for progressively cooling the ware to a temperature at which ware can be subjected to ambient air without breakage, characterized by apparatus for controlling the cooling rate of the ware comprising a cooling box having one perforate surface directed toward ware in the lehr for receiving radiant heat therefrom, duct means providing an exit for gas from said cooling box to the exterior of said lehr, duct means providing an entrance for gas from the exterior of the lehr to said cooling box, damper means in each of said duct means for varying the obstruction to the flow of gas therethrough, and means for moving said cooling box toward and away from said ware to vary the minimum distance between ware and said perforate surface.

7. A glass annealing lehr having means for moving ware into, through and from the lehr, and means for progressively cooling the ware to a temperature at which ware can be subjected to ambient air without breakage, characterized by apparatus for controlling the cooling rate of the ware comprising a series of laterally extending cooling boxes extending longitudinally through a portion of the lehr, each said cooling box having one perforate surface directed toward the ware in the lehr for receiving radiant heat therefrom, exhaust duct means providing an exit for gas from said cooling box to the exterior of said lehr, inlet duct means providing an entrance for gas from the exterior of the lehr to said cooling box, and means for moving a plurality of cooling boxes in said series toward and away from said ware.

8. A glass lehr having means for moving ware into, through and from the lehr, and means for progressively cooling the ware to a temperature at which ware can be subjected to ambient air without breakage, characterized by apparatus for controlling the cooling rate of the ware comprising a cooling box having one perforate surface directed toward ware in the lehr for receiving radiant heat therefrom, a baffle dividing said cooling box into a portion adjacent ware and a portion remote from ware, duct means providing an exit for gas from the portion of said cooling box remote from the ware to the exterior of said lehr, duct means providing an entrance for gas from the exterior of said lehr to the portion of said cooling box adjacent the ware and means for moving said cooling box toward and away from said ware.

References Cited in the file of this patent
UNITED STATES PATENTS

| 1,828,904 | Morton et al. | Oct. 27, 1931 |
| 2,133,783 | Merrill | Oct. 18, 1938 |